United States Patent [19]

Williams

[11] Patent Number: 5,797,549

[45] Date of Patent: Aug. 25, 1998

[54] APPARATUS FOR SEPARATING PLASTICS FROM PAPER FIBER

[76] Inventor: Robert M. Williams, 16 La Hacienda, Ladue, Mo. 63124

[21] Appl. No.: 659,277

[22] Filed: Jun. 6, 1996

[51] Int. Cl.⁶ ................................................. B02C 19/12
[52] U.S. Cl. ....................... 241/46.01; 241/65; 241/79.1; 241/DIG. 38
[58] Field of Search ......................... 241/46.01, 79.1, 241/DIG. 38, 65, 46.11, 46.17

[56] References Cited

U.S. PATENT DOCUMENTS

| | | | |
|---|---|---|---|
| 2,966,267 | 12/1960 | Dunbar | 209/271 |
| 2,974,793 | 3/1961 | Kuntz | 209/106 |
| 3,702,682 | 11/1972 | Williams | 241/48 |
| 3,814,240 | 6/1974 | Laundrie | 241/65 X |
| 4,072,273 | 2/1978 | Reiniger | 241/24 |
| 4,586,658 | 5/1986 | Eisenegger | 241/19 |
| 4,730,790 | 3/1988 | Williams | 241/81 |
| 5,387,267 | 2/1995 | Warf et al. | 241/79.1 |

Primary Examiner—John M. Husar
Attorney, Agent, or Firm—Polster, Lieder, Woodruff & Lucchesi, L.C.

[57] ABSTRACT

The apparatus for separating plastic from paper fibers includes conveying means for initially passing contaminated paper while removing waste, adding water to the flow of plastic contaminated paper for converting the paper to a pulp condition, agitating the water and paper pulp to release plastic material so that the paper pulp will more easily release the plastic material, directing the paper pulp to a dewatering step before grinding in a hammer mill while grinding the released plastic material to be used as a fuel for creating a drying atmosphere in the hammer mill, and packaging the paper from the hammer mill in bales.

9 Claims, 1 Drawing Sheet

APPARATUS FOR SEPARATING PLASTICS FROM PAPER FIBER

BACKGROUND OF THE INVENTION

This invention is directed to apparatus for processing paper and plastic material to separate the plastic to recovered and render the paper reusable.

The rendering of paper material recovered and usable by separating out plastic content has been carried out in hydrapurge detrashing systems employing a batch type pulper to extract the contaminants. This type of apparatus renders the paper stock pulpy and prevents breakdown of the contaminants. After the paper pulp has been separated the contaminants can be washed and discarded.

The method of operation of hydrapurge detrasher is to remove plastic contaminants in large pieces with little size reduction at a first level, protecting the system from retaining tramp metal in a simple operation having minimum control. Such systems have been designed for either pulping in batches or pulping in a continuous system.

Apparatus has been devised for separating materials consisting of those regarded as throw away waste, as well as materials having utility for recycling purposes. This type of apparatus includes the disclosures in Dunbar U.S. Pat. No. 2,966,267 of Dec. 27, 1960; Kuntz U.S. Pat. No. 2,974,793 of Mar. 14, 1961; Williams U.S. Pat. No. 3,702,682 of Nov. 14, 1972; Eisenegger U.S. Pat. No. 4,586,658 of May 6, 1986; and Williams U.S. Pat. No. 4,730,790 of Mar. 15, 1988. While these prior disclosures have dealt with non-paper materials there is a special problem when paper selected to be recycled for recovery has been contaminated with plastic material that need to be separated out to render the paper recyclable, thus leaving the plastic as a separate material having its own properties for further use.

BRIEF DESCRIPTION OF THE INVENTION

In a more efficient system, the paper and its plastic composition is moved on a roller conveyor which allows the dirt, metal and heavy material to fall away from the paper to be carried to a trash collector while the light weight paper directly contaminated with plastic is deposited in a system of pulping the paper for its recovery so the plastic contaminates are separated due to the paper content being converted to a pulpy mass in a series of cylinders. As the pulpy mass leaves the cylinders it is directed into a static mixer in the form of a screen which is formed with holes of a size to allow the paper in pulp form to bleed through the holes where it is collected in a vessel from which a pump can withdraw the paper pulp and deliver such material into a conveyor press to squeeze the liquid out of the pulp. The deliquidized pulp is conducted to an impact dryer so that the dried pulp is passed through a bag house where most of the residual liquid is exhausted. The recovered paper in its dried state is collected in a baler apparatus for delivery to commercial users.

BRIEF DESCRIPTION OF THE DRAWINGS

The invention is disclosed in a preferred embodiment in FIG. 1 showing the flow diagram.

DETAILED DESCRIPTION OF THE EMBODIMENT

Figure 1:
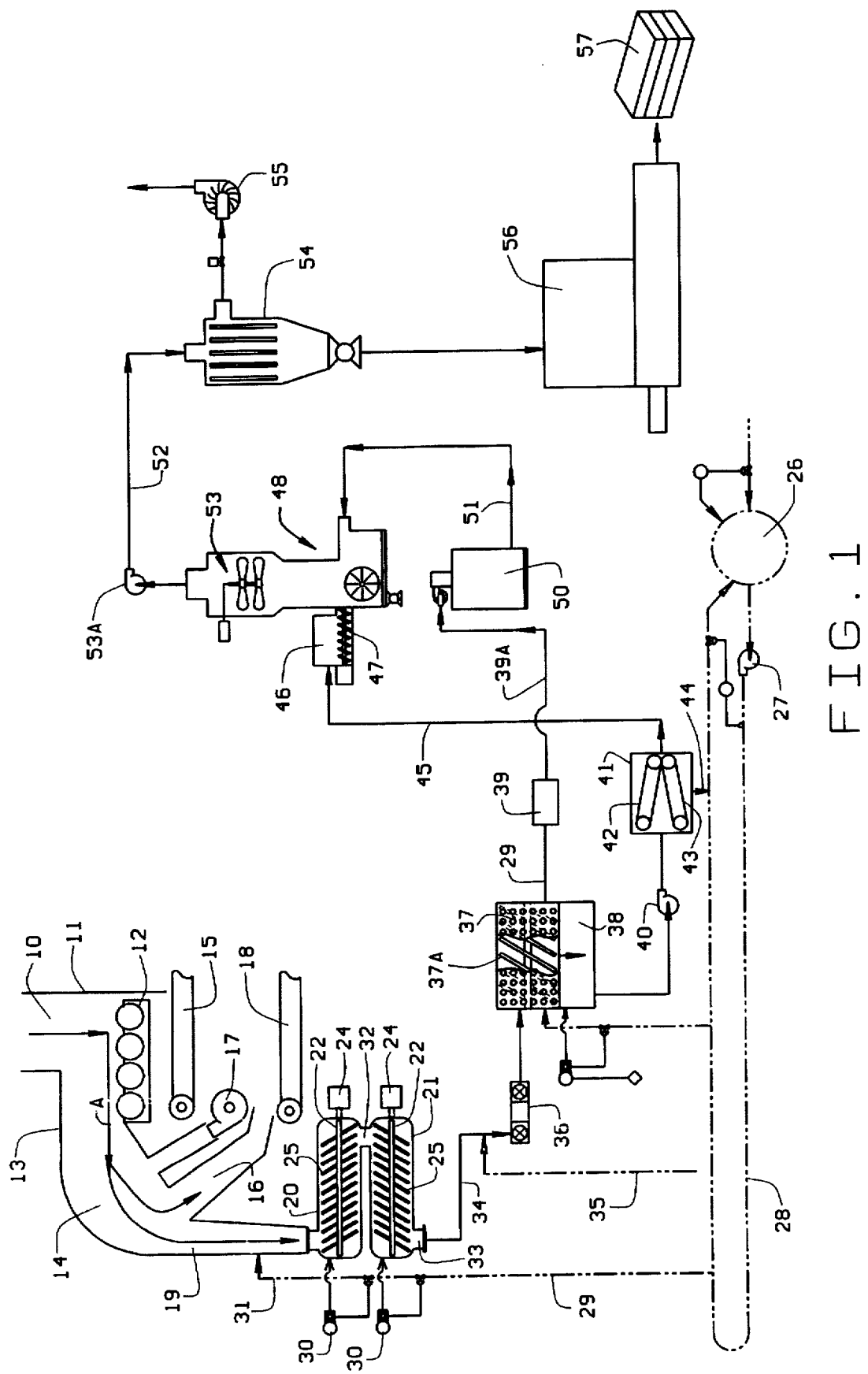

With reference to FIG. 1, the paper and plastic content is fed by a port 10 into a conveyor structure 11 having a conveyor made up of a rotary disc screen assembly 12 running in a channel having sides 13 to offer guidance to the incoming material until it is discharged into a receiving space 14. The travel of the paper and plastic is indicated by the arrow lines A. Any particle material like dirt and the like works its way through the discs screen and is collected and moved away on a belt conveyor 15. The heavy and dense material discharged into space 14 falls into a diversion chute 16 which directs such material onto a conveyor belt 18 as the result of the air delivery from a blower 17. The purpose for the blower is to support the light weight paper material and direct it into a chute 19 which feeds the paper material into a series of pulping cylinders 20 and 21.

Each pulp cylinder 20 and 21 is provided with a shaft 22 connected to motors 24 to rotate a group of flights 25 which agitate the paper at the same time that water from a supply tank 26 is delivered by a pump 27 through a system of conduits 28 and branch 29 each having separate pumps 30 which delivers the water to the respective tanks 20 and 21, as well as to an outlet line 31 which initiates the wetting of the paper material moving in chute 19. The quantity of water in the cylinders is as much as 32% of the volume of each cylinder. The cylinders are serially interconnected by a connection 32 so that the material delivered at a final outlet 33 is a slurry of paper pulp of about 96% water. That slurry is directed by a conduit 34 supplied by a branch water conduit 35 to a mixer device 36 connected into a screen 37 containing a spiral empellar 37A. The screen is formed with holes of a size to allow the pulp to pass into a tank 38 while the plastic content which cannot pass the holes flows on in conduit 29. At this stage in the flow diagram, the paper is a pulp mass in tank 38 while the plastic has been separated and flow into a grinder 39.

The pulp material is forced by pump 40 into a belt press 41 in which converging belts 42 and 43 squeeze a substantial quantity of the water into a conduit 44 which returns it to the tank 26. The pulp which contains a residual amount of water is delivered by conduit 45 to a bin 46 having a motor driven feed screw 47 which delivers the pulp into an impact mill 48. At the same time, the plastic material captured in the screen 37 is moved into a shredder 39 and thereafter it is delivered by conduit 39A to a burner 50 which furnishes heat in conduit 51 to supply the mill 48 with heat for drying the pulp material. Thus the dried pulp is conveyed by conduit 52 under the effort of fans 53 and pump 53A to be delivered into the baghouse 54 where water vapor is expelled to atmosphere at blower 55 while the pulp is delivered to a baler 56 which produces bales 57 of the recovered paper in substantially dried form.

The subject matter of the invention has been disclosed in relation to a preferred embodiment, however modification that come to mind within the spirit of the disclosure can encompass the flow system employing a single paper pulping cylinder or similar mean to carry out the desired preparation of the paper recovery.

What is claimed is:

1. Apparatus for recovery of paper from waste by subjecting paper contaminated with waste and plastic materials to a cleaning process for preparing the paper for recovery by recycling, the apparatus having components which include:
   a) conveying means having an inlet end for contaminated paper material, a discharge end spaced from said inlet end, and waste extracting means positioned adjacent said conveying means;
   b) paper pulping means connected to said conveying means outlet end;
   c) a source of water connected to said conveying means outlet end adjacent said connection to said paper pulping means to initiate paper pulping for supplying water thereto, said water being as much as 32 percent of the volume of said pulping means;

d) a pulp separating screen connected to said paper pulping means for effecting the separation of pulped paper, said separating screen being formed with holes of a size to pass pulp from remaining contaminants;

e) paper pulp collecting means at said pulp separating screen;

f) an impact mill connected to said paper pulp collecting means;

g) furnace means connected between said separating screen and said hammer mill for burning the separated contaminants to generate heat for said hammer mill to dry said recovered paper pulp; and h) a device for packaging said dried paper pulp in bales.

2. The apparatus set forth in claim 1 wherein said paper pulping means comprising a rotary shaft having a series of flights to agitate the paper pulp for separating plastic material from the recovered paper pulp.

3. The apparatus set forth in claim 1 wherein said remaining contaminants are subject to being ground in advance of reaching said furnace means.

4. The apparatus set forth in claim 1 further including a paper pulp squeezing belt press positioned between said impact mill and paper pulp collecting means for removing water from said paper pulp for recirculation back to said source of water.

5. In apparatus for separating plastic materials from waste paper to prepare the paper for recovery by recycling, the apparatus comprising:

a) a conveyor structure for moving material containing waste paper and plastic, said conveyor structure defining in part a guidance path;

b) an air blower for directing air along said guidance path to displace waste paper contaminated with plastic material into a defined path;

c) a paper pulping device positioned to receive the displaced waste paper contaminated with plastic material and including agitator means to promote the separation;

d) a supply of water connected to said guidance path to initiate the pulping of waste paper, said supply of water being connected to said pulping means to continue the pulping of the paper;

e) means to separate the paper in pulp form from the plastic contaminates;

f) a furnace to reduce the separated plastic contaminates and convert them to a source of heat;

g) a grinder for exposing the pulped paper to furnace heat to evaporate the water therefrom; and h) a device for packaging the dried paper for recycling.

6. The apparatus set forth in claim 5 wherein said means to separate the pulped paper includes a pulp separating screen provided with screen holes sized to pass only paper pulp and refuse passage of plastic material through said screen holes.

7. The apparatus set forth in claim 5 wherein said means to separate the paper pulp and the water into a path formed by perforated screen means is substantially impervious to the passage of plastic contaminates.

8. A system for recovering paper from waste comprising:

a conveyor having an inlet end for receiving waste and a discharge end, said conveyor refining a guidance path for said waste;

a blower for directing a force along said guidance path to displace at least paper into a define path;

a paper pulping device position to receive the displaced at least paper, said pulping device including an agitator structure;

a water supply connected to said paper pulping device;

a screen sized to separate the paper in pulp form from other waste material;

a furnace operatively arranged to receive the other waste material; and a grinder operatively arranged to receive the pulp paper and expose it to heat to evaporate the water therefrom.

9. The system of claim 8 further including a device for packaging the dried paper operatively associated with the grinder so as to receive dried pulp paper therefrom.

* * * * *